United States Patent [19]

Baxter et al.

[11] 4,040,526
[45] Aug. 9, 1977

[54] DUNNAGE BAG

[75] Inventors: Robert Olin Baxter; Arthur Louis Rothschild, III, both of Camden, Ark.

[73] Assignee: International Paper Company, New York, N.Y.

[21] Appl. No.: 670,709

[22] Filed: Mar. 26, 1976

[51] Int. Cl.² ............................................. B60P 7/14
[52] U.S. Cl. ............................ 214/10.5 D; 105/468
[58] Field of Search ................ 214/10.5 D; 105/468; 206/522

[56] References Cited

U.S. PATENT DOCUMENTS

| 3,199,689 | 8/1965 | Feldkamp | 214/10.5 D |
|---|---|---|---|
| 3,365,116 | 1/1968 | Ludlow | 214/10.5 D X |
| 3,462,027 | 8/1969 | Puckhaber | 214/10.5 D |
| 3,556,318 | 1/1971 | Hollis | 214/10.5 D |
| 3,868,026 | 2/1975 | Baxter | 214/10.5 D |
| 3,960,281 | 6/1976 | Reeves | 214/10.5 D |
| Re. 27,787 | 10/1973 | Evans | 214/10.5 D |

FOREIGN PATENT DOCUMENTS 702,322   1/1965   Canada .................. 105/468

Primary Examiner—Robert J. Spar
Assistant Examiner—George F. Abraham
Attorney, Agent, or Firm—Charles B. Smith

[57] ABSTRACT

An improved weatherproof dunnage bag for use in an open freight transport vehicle is provided. The bag includes an air bladder for expanding the bag and a plurality of air bladder reinforcing sheets enclosing the bladder. The outermost sheet is coated with a moisture resistant material and a moisture resistant overslip is provided surrounding each of two opposite ends of the bag. The overslips are heat sealed to the outermost sheet, so that the overslips and coating on the outermost sheet prevent moisture from pervading the sheets. A valve extending through the sheets from the bladder of the bag protrudes through an opening in one of the overslips, the opening having a diameter substantially equal to the inside diameter of the valve, so that the overslip fits tightly around the valve to prevent moisture from leaking into the bag around the valve. A moisture resistant tape is provided covering each seam in the outermost sheet.

1 Claim, 6 Drawing Figures

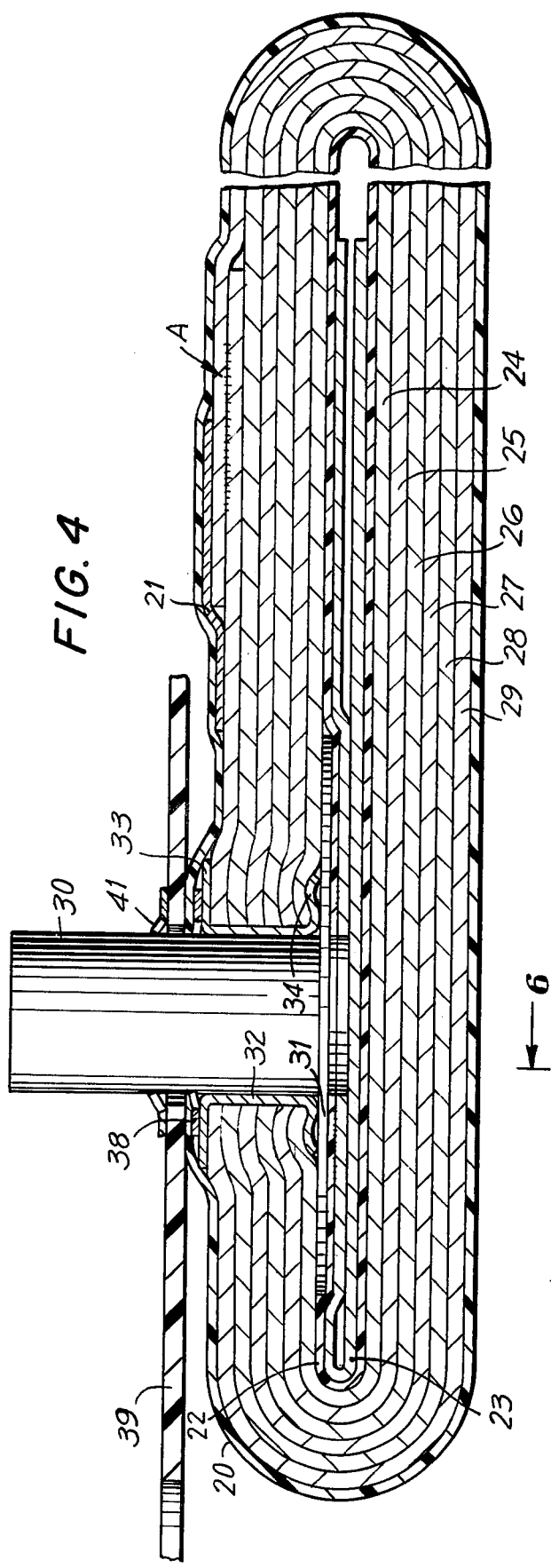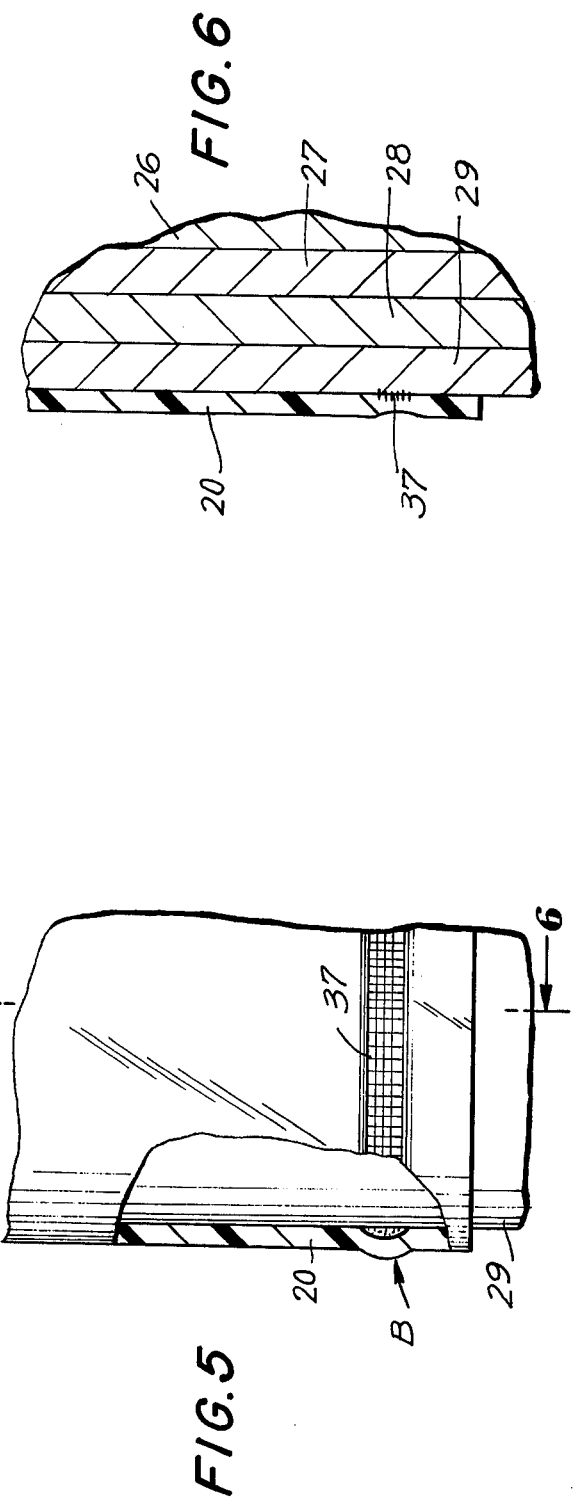

DUNNAGE BAG

BACKGROUND OF THE INVENTION

This invention relates to dunnage bags for use in the shipment of freight and, more particularly, to weatherproof dunnage bags for use in the shipment of freight in open vehicles.

When transporting freight, it is customary to bridge the space between the freight and the walls of the freight carrying compartment to prevent the freight from shifting, which could result in damage to the freight and/or compartment. The benefits derived from preventing such damage must however be balanced against the cost of time, labor, and materials involved in installing spacing or bridging materials between the freight and compartment walls before shipment, of removing such materials after shipment, and of disposing of the removed spacing or bridging materials. To reduce the time and labor of installation and removal, inflatable dunnage bags have been used to prevent freight shifting. An inflatable bag is first inserted into the space between the freight and the compartment walls and is then inflated through a valve in the bag. Although inflatable dunnage bags have been made of rubber and canvas, because of the cost of such a bag, it is usually necessary to deflate and return it to the shipper for re-use. Thus, dunnage bags have most recently been made of a less costly material, such as paper, so that the bag can be disposed of after use. Generally a disposable dunnage bag has an airtight bladder made of polyethylene, rubber or a like expandable material enclosed within a plurality of folded bladder reinforcing paper sheets. The sheets are superimposed one over the other in their longitudinal or machine direction. Each sheet is folded flat along parallel fold lines so that its back and front walls are between the fold lines and one of its longitudinal edges overlaps its other longitudinal edge. Where the longitudinal edges of the sheet overlap, the overlapped edges are glued to form a seam extending in the longitudinal, machine direction of the sheet. Each outer sheet is folded and has its edges overlapped and glued after the preceding inner sheet has been folded, overlapped, and glued, so that when all of the sheets have been folded, overlapped and glued, the sheets are not connected to each other. When expanded, the sheets form a multi-ply tube with each sheet in contact with the immediately adjacent outer sheet so that the sheets reinforce each other.

The airtight bladder when inflated expands into contact with the innermost sheet and is supported by the multiply tube. A valve is attached to the bladder and extends through the sheets so that it is accessible for inflating the bag.

Prior to use of such a dunnage bag, the bag is flat. When it is desired to use the bag, it is positioned, for instance, between two pieces of freight in the freight carrying compartment and is inflated through the valve to maintain the pieces of freight in their initial position. When the freight reaches its destination, the bag is ripped open and rapidly deflates. The deflated bag can then be removed and disposed of.

The strength of the bag will of course depend upon the strength and quality of the sheets, which largely depends upon the conditions under which the freight is being transported. For instance, when freight is being transported in an open freight vehicle, weather conditions have an important effect on the strength of the sheets. It has been found that under rainy conditions moisture enters the dunnage bag to significantly affect the strength of the paper protecting the bladder, so that premature rupture of the bladder results.

Because it is not economical to return to using the more expensive, non-disposable type of dunnage bag, which may be less apt to prematurely rupture, then a substantially paper dunnage bag which is waterproof is necessary.

Attempts to provide an inexpensive, reliable, substantially paper dunnage bag have been made. For instance, a prior art dunnage bag is shown in FIGS. 1 and 2 of this invention. The bag has an air bladder 10 enclosed within a plurality of folded bladder reinforcing sheets, indicated generally at 11. Surrounding the outermost of the sheets is a moisture resistant material in the form of an outer bag 12. Bag 12 surrounds the dunnage bag to prevent moisture from pervading the bladder reinforcing sheets. However, it is readily appreciated that the cost of such an outer bag 12 having the same size as a dunnage bag used in rail-cars and trucks makes this type of weatherproof dunnage bag impractical. Essentially, it has now been found that only certain portions of a dunnage bag need be protected by a layer of moisture resistant material if the present invention is utilized. For instance, it has been found that only the portions of a dunnage bag having exposed seams, folds, or similar openings where moisture may enter the bag actually need to be protected from invasion by moisture with such a layer.

A second disadvantage of the prior art dunnage bag shown in FIGS. 1 and 2 is that outer bag 12 has not been found to be efficient in preventing moisture from entering the bag around the bladder inflating valve of the bag, generally indicated at 13. Note in FIGS. 1 and 2 that valve 13 is placed over and inserted through an opening defined by portions of bag 12 so as to be in communication with bladder 10. It should also be noted that this prior art dunnage bag includes various structures mounted on valve 13, such as a reinforcing layer of rubber 12a affixed to bag 12 around valve 13, a first clip 15, rubber washers 16, a handle 17, and a grommet 14. The portions of outer bag 12 defining the opening through which valve 13 extends are encased by grommet 14 and do not actually abut against valve 13. Thus, in this prior art bag, outer bag 12 does not provide a moisture tight seal with the valve, so that moisture is prevented from leaking into the bag around valve 13.

The present invention overcomes the above-mentioned disadvantages. The weatherproof dunnage bag of the present invention utilizes moisture resistant overslips to cover only the ends of a substantially paper dunnage bag. Thus, the overslips cover and weatherproof those areas of the bag particularly prone to moisture damage. The dunnage bag of the present invention also includes a moisture resistant tape covering the longitudinal seam in the outermost sheet of the bag between the opposite ends of the bag covered by the overslips. Further, the dunnage bag of the present invention includes a moisture resistant coating on the outermost sheet. Thus, the dunnage bag of the present invention is weatherproofed without the need for being totally enclosed by a second moisture resistant bag. To avoid leakage of moisture into the bag from around the area of the valve, in the dunnage bag of the present invention, the opening defined in the overslip covering the valve is smaller than the outer diameter of the valve so that the overslip itself fits tightly around the valve to prevent moisture from pervading the sheets of the bag.

An object of the present invention is to provide a weatherproof dunnage bag less expensive and more efficient than the dunnage bags known in the prior art.

Another object of the present invention is to provide a dunnage bag for use in an open freight transporting vehicle which can be used without sustaining substantial damage by moisture pervading the sheets of the bag.

SUMMARY OF THE INVENTION

In an expandable dunnage bag having an airtight bladder, a multi-ply tube formed of a plurality of folded bladder reinforcing sheets enclosing the bladder, and a valve extending through the sheets through which air is introduced into the bladder, improvements for weatherproofing the bag are provided. The improvements comprise a moisture resistant coating on the outermost one of the sheets and a moisture resistant overslip surrounding each of two opposite ends of the bag, each overslip being sealed to the outermost sheet, whereby the overslips and coating weatherproof the bag by preventing moisture from pervading the sheets. A first one of the overslips has portions defining an opening having a diameter substantially equal to the inside diameter of the valve through which the valve extends, so that the opening defining portions of the overslip tightly fit around the valve. The improvements further include covering the seam in the outermost sheet of the bag with a moisture resistant tape.

BRIEF DESCRIPTION OF THE DRAWINGS

FIG. 4 is a cross sectional view of the bag shown in FIG. 3 taken along lines 4—4 of FIG. 3.

FIG. 5 is an enlarged view of the portion of the bag of FIG. 3 which is circled.

FIG. 6 is a cross sectional view of the portion of the bag of FIG. 3 shown in FIG. 5 taken along lines 6—6 of FIG. 5.

DESCRIPTION OF THE PREFERRED EMBODIMENTS

Figure 1:
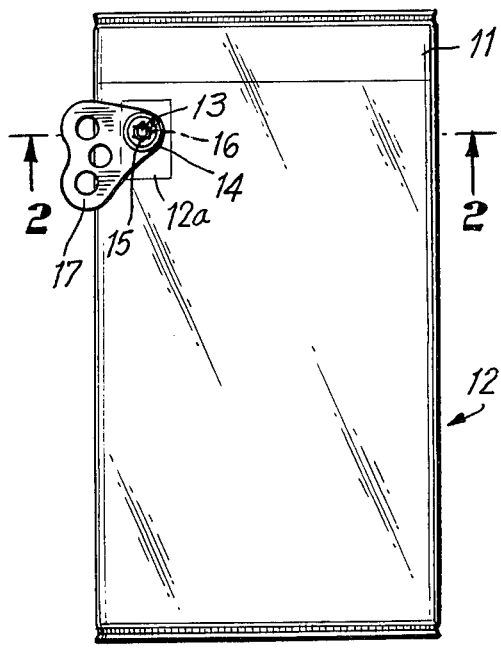
FIG. 1 is a top view of a prior art dunnage bag showing the bag enclosed within an outer moisture resistant second bag.
Figure 3:
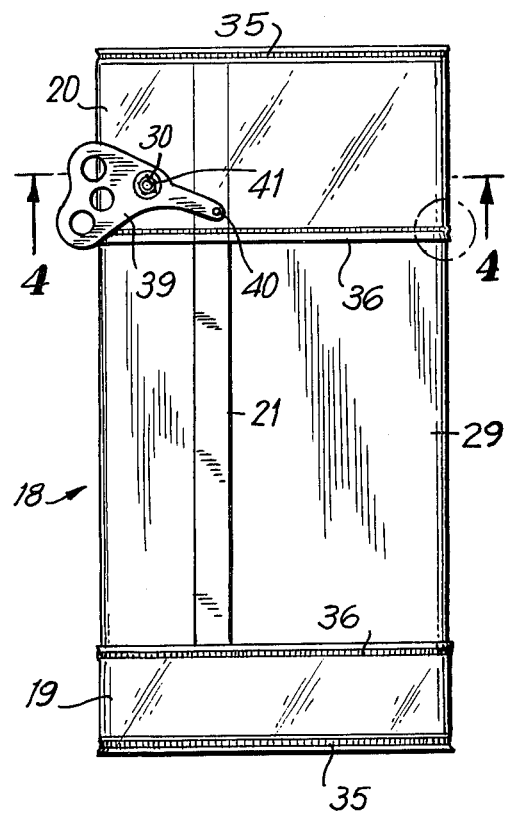
FIG. 3 is a top view of an embodiment of the weatherproof dunnage bag of the present invention.
Figure 2:
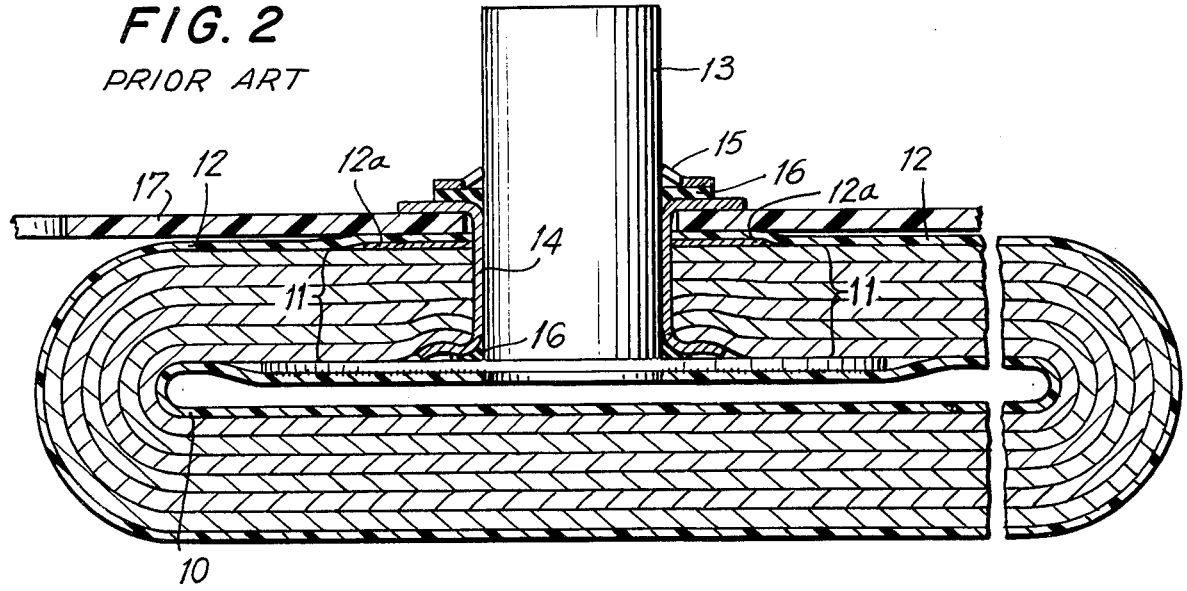
FIG. 2 is a cross sectional view of the prior art bag shown in FIG. 1 taken along lines 2—2 of FIG. 1.

Referring to the drawings and in particular to FIG. 3, there is shown an exemplary disposable dunnage bag provided with the weatherproofing features of the present invention. Although the particular construction of a dunnage bag improvable by this invention is generally not significant with respect to the utilization of the invention, the dunnage bag shown in FIGS. 3-6 is illustrative of those known in the prior art. In FIG. 3, the dunnage bag is generally indicated at 18. The weatherproofing features of the present invention utilized on bag 18 include moisture resistant overslips 19 and 20 surrounding each of two opposite ends of the bag, a moisture resistant coating on the outermost surface of the bag at those areas of the bag not covered by overslips 19 and 20, and a moisture resistant tape 21 covering a longitudinal seam in the outermost surface of the bag. These and the other weatherproofing features of the present invention will be discussed in detail below. The following discussion of the construction of this dunnage bag is helpful in understanding the improvements in a dunnage bag provided by the present invention.

As shown in FIG. 4, a dunnage bag includes an airtight bladder 22. As mentioned above, by inflation of the bladder when the bag is placed between the freight in a freight transporting compartment, the freight is held in position. Enclosed within and attached to the top face of bladder 22 is a folded flexible sheet 23 which prevents damage to the bladder upon the sudden rush of air into it during inflation. Bladder 22 is generally a thin wall tube made of polyethylene which has been extruded as a tube.

Surrounding bladder 22 are the folded, paper bladder reinforcing sheets discussed above. In the construction of the bag shown in FIG. 4, six sheets of paper 24-29 are each wrapped about a longitudinal axis and one edge of each sheet overlaps the other edge of the sheet and is sealed thereto to form several overlapped joints in the various sheets, one of which is indicated at point A in FIG. 4. As such there is provided six tubes surrounding bladder 22. The particular details of construction and manufacture of a dunnage bag are explained in U.S. Pat. No. Re. 27,787, which patent is incorporated herein by reference.

As shown in FIGS. 3 and 4, a valve 30 is inserted through both overslip 20, the six reinforcing sheets 24-29, the top face of bladder 22, and one portion of sheet 23 to allow for inflation of bladder 22. Preferably, valve 30 has a flange 31 which is sealed to the upper surface of the top face of bladder 22 to maintain a seal for prevention of air leakage between the valve and bladder. Also, sheet 23 protecting the bladder during inflation may be sealed to the bottom surface of the top face of bladder 22 through which valve 30 is inserted. Again referring to FIG. 4, adjacent to and surrounding valve 30 is a grommet 32, which encases the portions of sheets 24-29 that define the opening through which valve 30 is inserted. Opposing faces 33 and 34 of grommet 32 are crimped to grip sheets 24-29.

The present invention efficiently waterproofs the above described prior art dunnage bags. First, outermost sheet 29 of bag 18 is coated with a moisture resistant coating, such as a thermoplastic material. If the material from which sheet 29 is made is paper, then several coating materials can be utilized, such as a wax or polyethylene.

Overslips 19 and 20 are provided surrounding two opposite ends of bag 18. Generally one prefers to surround the ends of the bag where the sheets 24-29 have been folded in cross directions because at such a fold moisture may most easily leak into the bag. The overslips are preferably made of a moisture resistant material, such as a thermoplastic material, but they also may be made of a substrate such as paper, coated with a moisture resistant coating. As shown in FIG. 3, overslips 19 and 20 surround only a minor portion of bag 18, in contrast to the prior art bag discussed above.

Overslips 19 and 20 are sealed to outermost sheet 29 of bag 18. Thus, the coating of sheet 29 with a moisture resistant material and the sealing of overslips 19 and 20 to sheet 29 effectively weatherproofs bag 18 by preventing moisture from pervading the bag. It should be noted that only the portions of outermost sheet 29 not covered by overslips 19 and 20 need be coated with the moisture resistant coating or if desired the entire sheet may be coated for extra protection. Several means for sealing overslips 19 and 20 to sheet 29 may be utilized. The edge of the closed end of each overslip 19 and 20 indicated as 35 and of the open end of each indicated as 36 may both be heat sealed to sheet 29 or only the edges of ends 36 may be heat sealed to sheet 29. Also, a hot-melt adhesive may be applied to outermost sheet 29 to seal all the edges or only the edges 35 and/or 36 of the overslips to sheet 29. Further, the hot-melt adhesive may be randomly applied to completely cover outermost sheet 29 in those areas of the sheet covered by overslips 19 and 20. FIG. 5 shows in enlargement the circled portion of FIG. 3 where edge 36 of overslip 20 is sealed to outermost sheet 29 of bag 18. The seal indicated as 37 extends around bag 18 so that no moisture may leak into the bag through edge 36 at point B. Seal 37 is also shown in FIG. 6. The overslips can be sealed to the outermost sheet 29 by any number of ways, such as heat sealing, hot melt adhesive, and/or liquid adhesive such as latex or epoxy or any combination of these and others.

Again referring to FIG. 4, it is apparent that at a point on the outer surface of sheet 29 adjacent sealing point A, the overlapping edge of sheet 29 will make a seam in the longitudinal direction of sheet 29. The seam extends from one to the other of the ends of bag 18 covered by overslips 19 and 20. In fact, overslips 19 and 20 cover the ends of the seam. To prevent moisture from pervading sheet 29 at this seam (or any additional seam in bag 18), moisture resistant tape 21 is applied to sheet 29 covering the seam. Preferably, tape 21 covers only the portion of the seam between the seam ends but it can also be extended under the overslips prior to their being sealed to sheet 29 if desired. These alternatives are illustrated respectively at overslips 20 and 19 in FIG. 3. A type of tape which has been found to be particularly useful is one conforming to Federal Specification JAN-P-127; one in particular being a No. 5863 tape available from the Mystic Tape Division of the Borden Chemical Company.

A further dunnage bag weatherproofing feature of the present invention is the provision of means for preventing moisture leakage into the bag around valve 30. The means include first an opening defined by portions of overslip 20 through which valve 30 is inserted which has a diameter substantially equal to the inside diameter of valve 30 and second abutment of these opening defining portions directly against valve 30, so that the portions tightly fit around the valve to prevent moisture leakage into the bag. It is within the scope of this invention for one to determine the diameter of the opening in overslip 20, but it should not be of any diameter which would lead to moisture leakage into the bag. Because the materials of which overslips 19 and 20 are made will generally be somewhat stretchable, when overslip 20 is applied to bag 18 and valve 30 is inserted through the opening, the opening defining portions of the overslip will stretch sufficiently to allow this insertion but afterwards these portions of the overslip will be in a tight frictional engagement with the valve.

Preferably, means are also utilized to prevent vertical movement of the opening defining portions of overslip 20 relative to valve 30. These means include one or more clips, through which valve 30 is extended, in frictional engagement with the valve. The clips, generally known as "Tinnerman clips", can be placed both over and under the opening defining portions of overslip 20 or only over these portions to hold the overslip in place. As shown in FIG. 4, a first clip 38 underlies overslip 20. Placed above overslip 20 is a handle 39 through which valve 30 is inserted. The handle has a cap 40 for sealing valve 30, as shown in FIG. 3. Handle 39 may be omitted entirely or a washer may be used in its place. Positioned over handle 39 is a second clip 41. Thus, clips 38 and 41, or in the alternative only clip 41 above, hold whatever structures are positioned between them in place and also prevent flange 31 of valve 30 from vertically moving out of abutment with face 34 of grommet 32 and inner sheet 24.

A method of weatherproofing a dunnage bag includes applying the moisture resistant coating to the outermost sheet of the bag, surrounding each of two opposite ends of the bag with one of the moisture resistant overslips, and sealing the overslips to the outermost sheet. Preferably, the outermost sheet 29 is coated with the moisture resistant material and the longitudinal seam in sheet 29 is covered with the moisture resistant tape 21 prior to the application of overslips 19 and/or 20 to the bag. However, it is within the scope of this invention to cover the ends of the bag with overslips 19 and 20 prior to application of the moisture resistant coating and tape 21. In this latter case, only the portions of outermost sheet 29 of the bag between the ends of the bag covered by overslips 19 and 20 would have the coating and tape applied thereto. It is further preferred that although the overslips 19 and 20 are applied prior to the application of the moisture resistant coating and tape 21, that the sealing of the overslips 19 and 20 to the outermost sheet 29 be effected after the application of the coating and tape. The method further includes covering valve 30 with overslip 20 when the overslip is being applied to the bag and extending valve 30 through an opening defined by portions of overslip 20. This extension is accomplished essentially by slightly stretching the opening defining portions of overslip 20 over the valve so that these portions tightly fit around the valve because the opening has a diameter substantially equal to the inside diameter of the valve. Preferably, the method will further include placing the handle 39 over overslip 20 and extending the valve through an opening defined in the handle. To maintain handle 39 and overslip 20 in position, a first clip may be placed over handle 39 or two clips 38 and 41 may be placed respectively under and over the handle and overslip to essentially squeeze the opening defining portions of the overslip between the clips and/or handle.

The above description of the preferred embodiments of this invention are intended for illustration only and alternative embodiments of the invention are contemplated to be within the skill of those versed in the art and to be covered by the claims appended hereto.

What is claimed is:

1. In an expandable dunnage bag having an airtight bladder, a multi-ply tube formed of a plurality of bladder reinforcing sheets enclosing the bladder, and a valve extending through the sheets through which air is introduced into the bladder to expand the bag, the improvement comprising a moisture resistant coating on the outermost one of the sheets;

a moisture resistant overslip surrounding each of two opposite ends of the bag, the overslips together surrounding only a minor portion of the bag, each overslip being made of thermoplastic material compatible with the coating on the outermost sheet and having an open and closed end, the closed end of each overslip being adjacent the outermost edge of the end of the bag the overslip surrounds and the open end of each overslip being heat sealed to the outermost sheet;

the outermost sheet having at least one seam extending from one to the other of the two opposite ends of the bag, the overslips each covering an end of the seam and a moisture resistant tape covering the portion of the seam between the seam ends;

portions of one of the overslips defining an opening through which the valve extends, the opening having a diameter substantially equal to the inside diameter of the valve, so that the opening defining portions tightly fit around the valve;

a first clip through which the valve extends, the first clip underlying the opening defining portions of the first overslip and being in frictional engagement with the valve;

a bag handle through which the valve extends, the handle overlying the opening defining portions of the first overslip and having a cap for sealing the valve;

a second clip overlying the opening defining portions of the first overslip and being in frictional engagement with the valve, so that the opening defining portions of the first overslip are positioned between the first and second clips, whereby the overslips and coating weatherproof the bag by preventing moisture from pervading the sheets.

* * * * *